(12) United States Patent
Li et al.

(10) Patent No.: US 6,274,063 B1
(45) Date of Patent: Aug. 14, 2001

(54) METAL POLISHING COMPOSITION

(75) Inventors: Jiangning Li, Fremont; Ming M. Yang, San Jose, both of CA (US)

(73) Assignee: HMT Technology Corporation, Fremont, CA (US)

( * ) Notice: Subject to any disclaimer, the term of this patent is extended or adjusted under 35 U.S.C. 154(b) by 0 days.

(21) Appl. No.: 09/231,247

(22) Filed: Jan. 15, 1999

Related U.S. Application Data
(60) Provisional application No. 60/107,377, filed on Nov. 6, 1998.

(51) Int. Cl.[7] ............................ C09K 13/00; H01L 21/302
(52) U.S. Cl. .......................... 252/79.1; 438/692; 438/693; 216/89; 216/100; 216/101
(58) Field of Search .................. 252/79.1, 79.2, 252/79.5; 438/692, 693; 216/38, 53, 89, 100, 101, 108

(56) References Cited

U.S. PATENT DOCUMENTS

| | | |
|---|---|---|
| 4,305,779 | 12/1981 | Steeves et al. . |
| 4,475,981 | 10/1984 | Rea . |
| 4,956,015 * | 9/1990 | Okajima et al. ........................ 106/3 |
| 4,959,113 | 9/1990 | Roberts . |
| 5,166,006 | 11/1992 | Lal et al. . |
| 5,689,879 | 11/1997 | Urasaki et al. . |
| 5,811,355 | 9/1998 | Jordan . |
| 6,068,787 * | 5/2000 | Grumbine et al. ................. 252/79.1 |

* cited by examiner

Primary Examiner—Gregory Mills
Assistant Examiner—Luz L. Alejandro
(74) Attorney, Agent, or Firm—LeeAnn Gorthey

(57) ABSTRACT

Polishing slurries for use in polishing substrates having a nickel or nickel-containing surface, such as those used for magnetic media, are described. The slurries include, in addition to a chemical etchant such as aluminum nitrate and suspended abrasive particles, an oxidizer which converts nickel metal at the surface to nickel oxide, but does not solubilize the nickel oxide in the aqueous medium to any significant degree. Preferred oxidizers include hydrogen peroxide, ferric nitrate and potassium iodate.

17 Claims, 5 Drawing Sheets

METAL POLISHING COMPOSITION

This application claims the benefit of U.S. Provisional Patent Application Serial No. 60/107,377 filed Nov. 6, 1998, which is incorporated herein by reference.

FIELD OF THE INVENTION

The present invention relates to polishing slurries which produce very smooth surfaces on nickel- or nickel alloy-plated substrates, and methods of their preparation and use.

BACKGROUND OF THE INVENTION

Over the past several years, a significant increase in recording density in thin-film magnetic recording discs has been achieved, and there is a continuing effort to increase recording density further. Reducing the head-to-disk spacing, or the flying height, is one of the more effective ways to achieve a higher density on a magnetic rigid disk. As the read/write head is moved closer to the disk, there is less overlap of voltage signals in adjacent magnetic domains in the disk, with a corresponding increase in recording density. However, to have read/write heads flying over the disk surfaces at sub-microinch spacing, the topography of the disk surface must be very uniform. Current polishing methods for Ni/P plated disks commonly employ polishing slurries which are primarily mechanical in action, containing micron- or submicron-sized abrasive particles and a chemical accelerator, typically $Al(NO_3)_3$ (aluminum nitrate). These methods have produced surfaces having roughness averages (RA) of about 0.4 nm (4 Å). However, methods of polishing such surfaces to still greater smoothness are sought.

SUMMARY OF THE INVENTION

The present invention includes, in one aspect, a composition for use in polishing a substrate having a nickel or nickel alloy surface. The composition is an aqueous slurry comprising an aqueous medium, typically deionized water, and containing the following components: (a) a soluble chemical etchant effective to convert nickel metal at the surface to a water soluble nickel salt, (b) suspended abrasive particles, and (c) a soluble oxidizer effective to convert nickel metal at the surface to nickel oxide. In a preferred embodiment, neither the etchant nor the oxidizer is capable, under normal polishing conditions, of solubilizing the nickel oxide in the aqueous medium to any significant extent. The etchant is preferably $Al(NO_3)_3$. The oxidizer is preferably a mild oxidant, such as $H_2O_2$, $Fe(NO_3)_3$, or $KIO_3$. Hydrogen peroxide ($H_2O_2$) is particularly preferred.

In preferred compositions, $Al(NO_3)_3$ is present in the aqueous medium at a concentration between about 0.1 and 1.0 weight percent, more preferably between about 0.1 and 0.5 weight percent, and most preferably between about 0.25 and 0.30 weight percent. Hydrogen peroxide is preferably present in the aqueous medium at a concentration between about 0.1 and 1.0 weight percent, more preferably between about 0.1 and 0.5 weight percent, and most preferably between about 0.15 and 0.30 weight percent.

The abrasive particles are generally selected from aluminum oxide particles, silicon dioxide particles, titanium dioxide particles, and a combination thereof. For first-step (coarse) polishing, the particles are typically between about 0.5 and 1.2μ in diameter ($d_{50}$); for second-step (fine or "super") polishing, the particles are typically between about 0.1 and 0.3μ in diameter ($d_{50}$).

The composition may further contain a surfactant, for example, a polyethylene glycol-based surfactant, effective to maintain the particles dispersed in the aqueous medium. It may also contain a buffer to maintain the pH of the composition between about 2.5 and 4.5.

In another aspect, the invention provides a method of polishing a substrate having a nickel or nickel alloy surface. The method comprises applying to the substrate surface, a composition containing, in an aqueous medium, components (a)–(c) as described above, pressing a polishing pad against the substrate in the presence of the composition, and moving the pad relative to the substrate.

The invention also provides methods of preparing a polishing composition useful in polishing a substrate having a nickel or nickel alloy surface. The composition or slurry is prepared by adding to an aqueous suspension of abrasive particles, components (a) and (c) as described above, preferably in the preferred concentrations described above. Alternatively, the slurry may be prepared in more concentrated form, in which case the method of preparation further includes adding deionized water to the suspension as necessary to attain the preferred concentrations described above. Another method of preparing the polishing slurry comprises adding an oxidizer, as described above, to an aqueous medium which already contains components (a) and (b).

These and other objects and features of the invention will become more fully apparent when the following detailed description of the invention is read in conjunction with the accompanying drawings.

DETAILED DESCRIPTION OF THE INVENTION

I. Polishing Slurry

The polishing slurry, useful for polishing a substrate having a nickel or nickel alloy surface, includes the following components suspended or dissolved in deionized water: (a) a water-soluble chemical etchant which is effective to convert nickel metal at the surface to a water soluble nickel salt, (b) suspended abrasive particles, and (c) a water-soluble oxidizer effective to convert nickel metal at the surface to nickel oxide. Preferably, the oxidizer is substantially ineffective, under normal conditions of such polishing, to solubilize the nickel oxide in the aqueous medium. For example, nitric acid/hydrogen peroxide has been used for chemical etching, in the absence of abrasion (e.g. U.S. Pat. No. 5,166,006). However, nitric acid also reacts with and solubilizes nickel oxide (e.g. U.S. Pat. No. 5,689,879), and thus would not be a preferred oxidizer, or major component thereof, in the present compositions.

Figure 1:
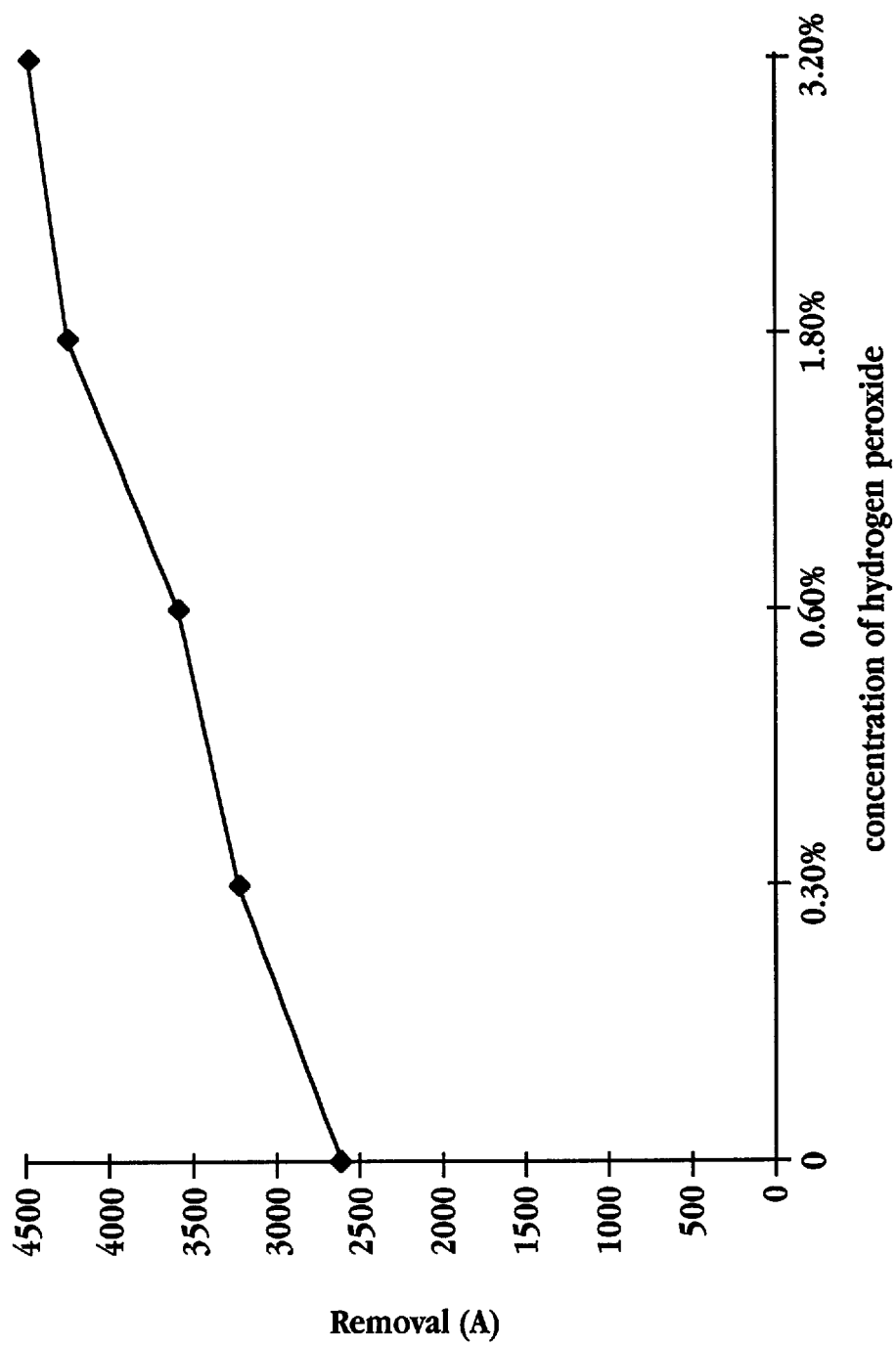
FIG. 1 shows total metal removal over a six minute period of second-step polishing, using a $Al(NO_3)_3/TiO_2$ polishing slurry (0.2 wt % $Al(NO_3)_3$, 4 wt % $TiO_2$, 0.2μ) containing increasing amounts of $H_2O_2$.

Although the compositions are not limited by mechanism of action, it is believed that the polishing action of these compositions preferentially removes material from the "peaks" occurring on the metal surface, as opposed to the "valleys". The oxidizer, for example, hydrogen peroxide, forms a passivated layer of nickel oxide on the surface; this oxide layer is not significantly attacked or solubilized by the etchant. The oxide layer is, however, more easily abraded than the nickel metal or alloy. The increased abrasion results in an increased removal rate, as shown in FIG. 1. (The figure shows the total removal, in Angstroms, over a six-minute period during a superpolishing (second step polishing) operation.) In addition, it is postulated that the oxide on the peaks of the rough surface, being more accessible than that in the valleys, is preferentially abraded, thus exposing nickel metal at the peaks, but not the valleys, to the chemical etchant. This preferential etching of the peaks results in the exceptional smoothness shown in FIGS. 2 and 4.

The etchant is preferably $Al(NO_3)_3$, which is widely used in existing polishing slurries, and is presumed to act by conversion of nickel metal to water soluble nickel nitrate. Although this compound is the most commonly used in the industry, other compounds which are soluble in water and which convert nickel metal to a water-soluble nickel salt may also be effective. The oxidizer is preferably a mild oxidizer, soluble in water, such as $H_2O_2$, $Fe(NO_3)_3$, or $KIO_3$. Hydrogen peroxide ($H_2O_2$) is particularly preferred.

In preferred compositions, $Al(NO_3)_3$ is present in the aqueous medium at a concentration between about 0.1 and 1.0 weight percent, more preferably between about 0.1 and 0.5 weight percent, and most preferably between about 0.25 and 0.30 weight percent. Hydrogen peroxide is preferably present in the aqueous medium at a concentration between about 0.1 and 1.0 weight percent, more preferably between about 0.10 and 0.5 weight percent, and most preferably between about 0.15 and 0.30 weight percent. Although higher concentrations of hydrogen peroxide, e.g. up to 3.0 weight percent or more, can also be used, such concentrations are more likely to cause pitting problems if the composition is left in contact with the disk for extended periods of time.

The abrasive particles are generally selected from aluminum oxide particles, silicon dioxide particles, titanium dioxide particles, and a combination thereof. For first-step (coarse) polishing, the particles are typically between about 0.5 and $1.2\mu$ in diameter; for second-step polishing, the particles are typically between about 0.1 and $0.3\mu$ in diameter. The abrasive particles may be present at a weight percent of about 2% up to about 15%; levels of about 4% to about 8% are preferred.

The compositions typically contain a surfactant, for example, a polyethylene glycol oligomer or polymer, which is effective to maintain the particles dispersed in the aqueous medium. Although ionic surfactants are also available, nonionic surfactants, such as the PEG-based surfactants, are preferred for acidic polishing compositions. Variation of surfactant per se, however, has little or no effect on the surface finish of the polished substrate.

The composition may also contain a buffer to maintain the pH between about 2.5 and 4.5. Lower pH's are generally not desirable, as higher acidity can cause pitting of the metal surface.

The present compositions may be prepared by combining the components in deionized water in the relative amounts given above. Generally, in the preparation of such polishing slurries, a uniform suspension of the particles and surfactant is first prepared, and then additional components are added. The slurry may be provided as a concentrate, and diluted before use with deionized water to give the appropriate concentrations, as is common in the industry. Further, because commercially available slurries generally contain appropriate amounts of abrasive particles, surfactant, etchant (typically aluminum nitrate) and buffer, it is also possible to prepare the presently disclosed compositions by addition of an appropriate amount of the mild oxidizer to such a commercial preparation.

II. Polishing Operation

Disks are generally polished between upper and lower polishing plates, in a polishing apparatus such as those well known in the art. The upper plate is suspended from an upper support structure. Air cylinders or air bags within the support structure are able to raise and lower the upper plate and to control the total pressure applied by the upper plate to the disks and lower plate. The disks to be polished are contained within carriers supported on the lower plate; the rotation of these carriers is driven by inner pin rings. For optimum polishing, the upper and lower plates rotate in opposite directions, and the carriers are rotated independently. Relative rotation speeds may be adjusted according to standards known in the art. The facing surfaces of the polishing plates are typically covered with porous polyurethane pads, and the upper plate is provided with apertures for introduction of the polishing slurry or rinse water.

Substrates are typically aluminum disks coated with a nickel/phosphorus alloy, as commonly used for magnetic recording media. Polishing is required to produce a smooth, flat surface and remove defects arising from earlier processing steps. Prior to polishing, a Ni/P plated substrate surface typically has an RA (roughness average) of about 15–20 nm (150–200 Å).

Figure 3:
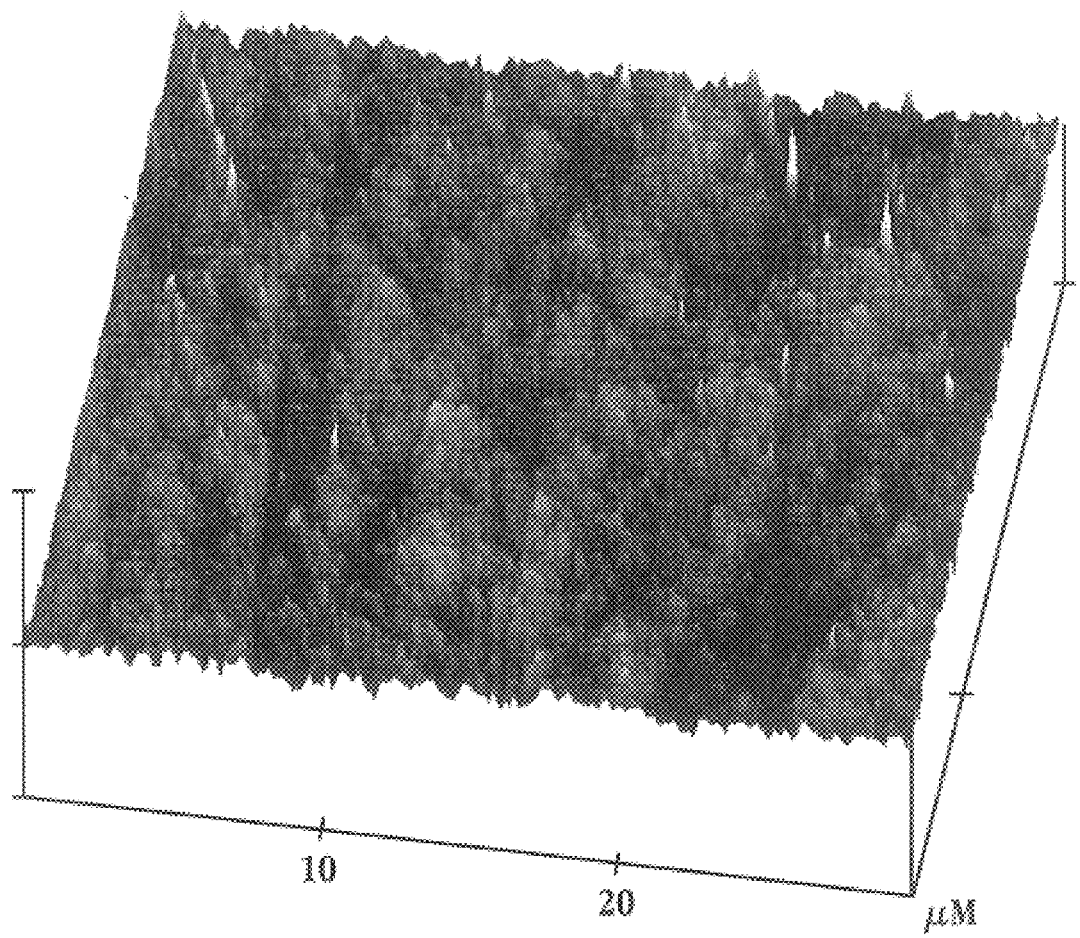
FIG. 3 is a computer-generated image of an AFM (atomic force microscopy) image of a Ni/P plated substrate having a roughness average (RA) of about 1.5 nm, after first-step polishing using a conventional polishing slurry.

A typical polishing operation employs multiple stages of polishing, with slurries of different abrasiveness and polishing pads of different hardness. The first step employs particles having sizes of about $0.5\mu$ to $1.2\mu$, preferably about $0.5\mu$ to $0.8\mu$ ($d_{50}$), and serves to increase the flatness of the disk, reduce microwaviness (WA), increase smoothness, and remove defects such as bumps, plating stains, and grinding marks. This first polishing step generally results in a surface roughness of about 10–20 Å. An AFM image of such a surface is shown in FIG. 3.

A high overall removal rate is desirable in the first polishing step, since it reduces the time needed for polishing. As described in Example 1, use of a polishing slurry containing $H_2O_2$, as described herein, in first-step polishing increased the removal rate without causing pitting.

The first polishing step is followed by a cleaning process and then a second, superpolishing step. A polishing slurry containing a suspension of smaller (about 0.1 to $0.3\mu$ in diameter ($d_{50}$)) and softer abrasive particles is used for this step. In this step, the roughness average (RA) of the surface is reduced to less than 10 Å.

Figure 2:
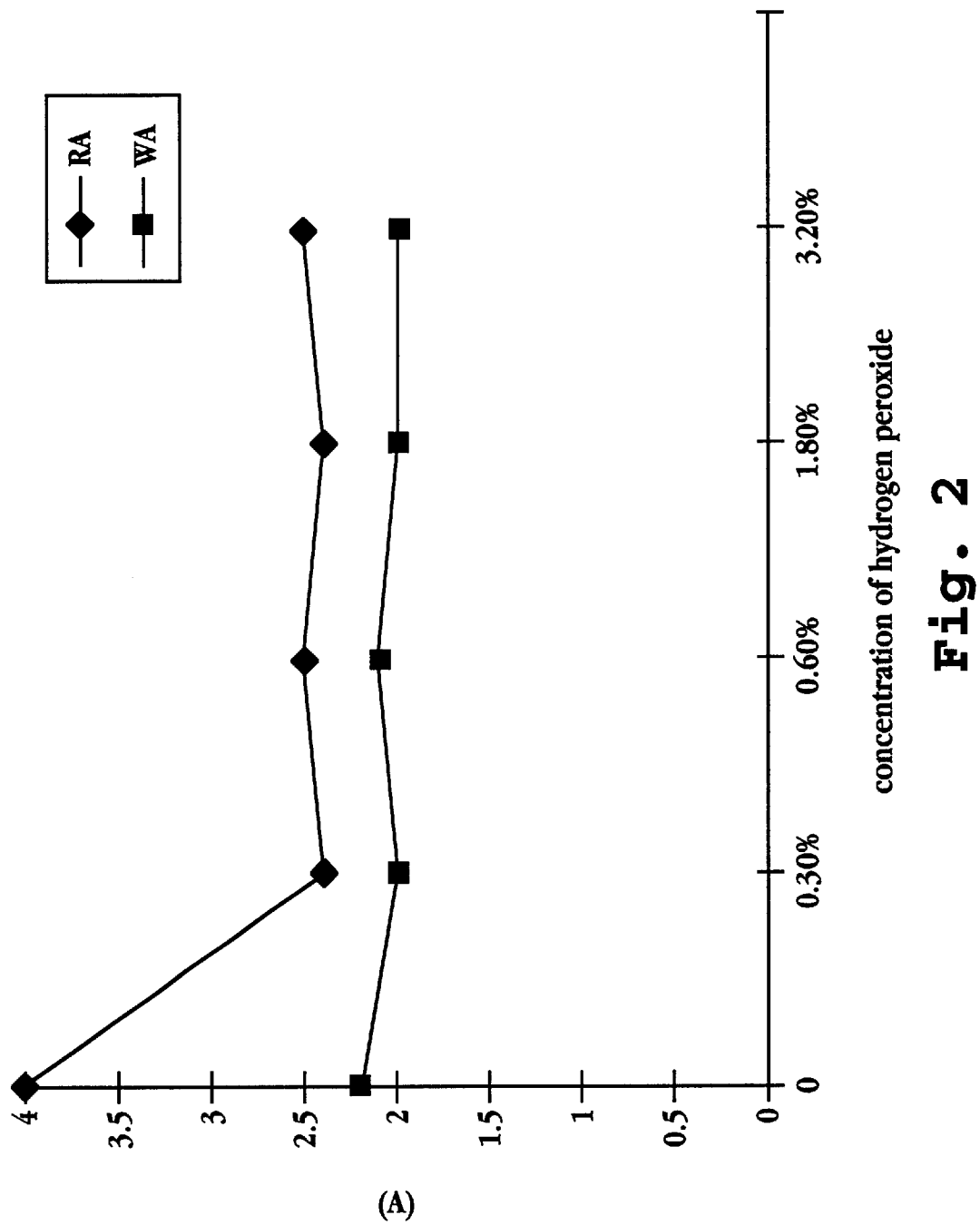
FIG. 2 shows the effect of adding increasing amounts of $H_2O_2$ to the $Al(NO_3)_3/TiO_2$ polishing slurry of FIG. 1 on the roughness (RA) and microwaviness (WA) of a substrate surface polished using the slurry (second-step polishing)
Figure 4:
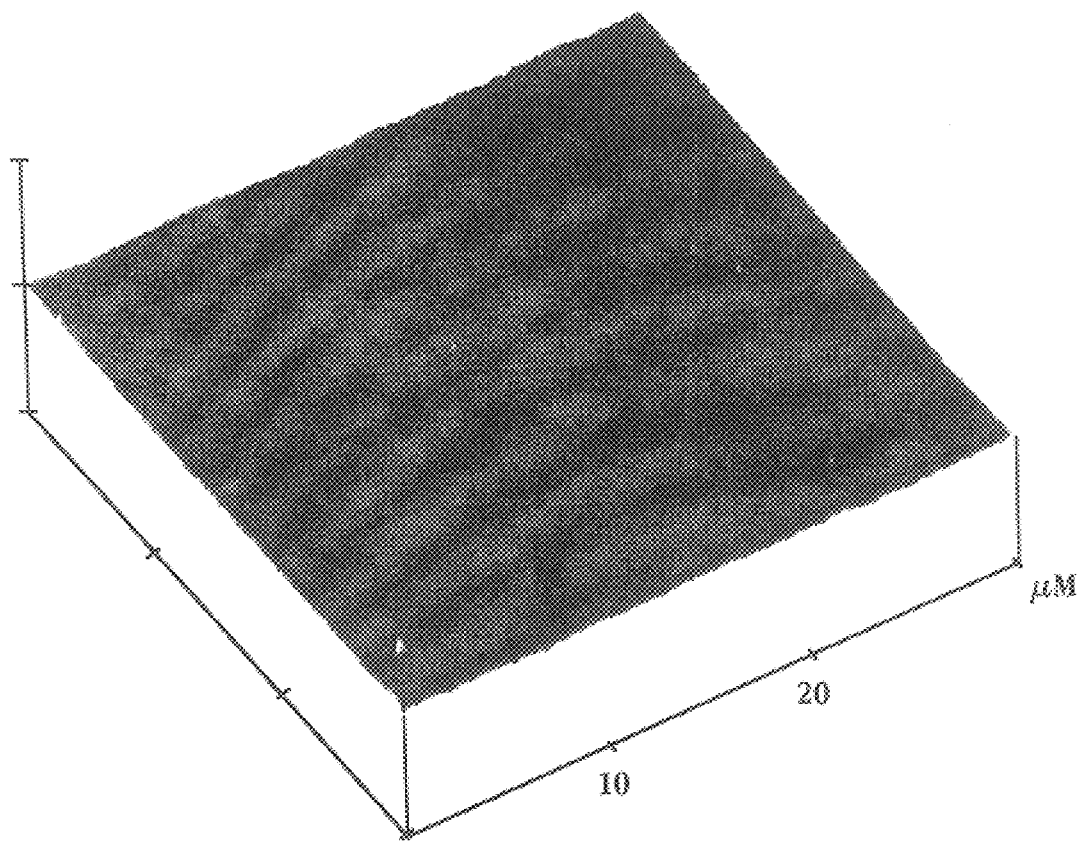
FIG. 4 is a computer-generated image of an AFM image of a similar substrate, having an RA of about 0.25 nm (2.5 Å), after second-step polishing (superpolishing) using a polishing slurry of the invention, containing 0.3 wt % $H_2O_2$.

As shown in FIG. 2, inclusion of $H_2O_2$ in the second-step polishing slurry, at levels as low as 0.3 weight %, produced an RA of about 0.25 nm (2.5 Å). FIG. 1 shows that removal rate was also increased. A surface polished in this manner, using a slurry containing containing 0.3 wt % $H_2O_2$, 0.2 wt % $Al(NO_3)_3$, 4 weight % $TiO_2$ particles ($0.2\mu$), and a surfactant and buffer (pH about 3.0–3.2) (see Example 2), showed very few defects (i.e. one or two very shallow scratches) on the AFM image (FIG. 4). (Note: the pattern of broad bands apparent in the Figure is an artifact of the computer scanning process and was not present in the original AFM image.) Later studies showed that levels as low as 0.1 to 0.15 weight % $H_2O_2$ also gave good results, i.e. RA's less than 4 Å.

Figure 5:
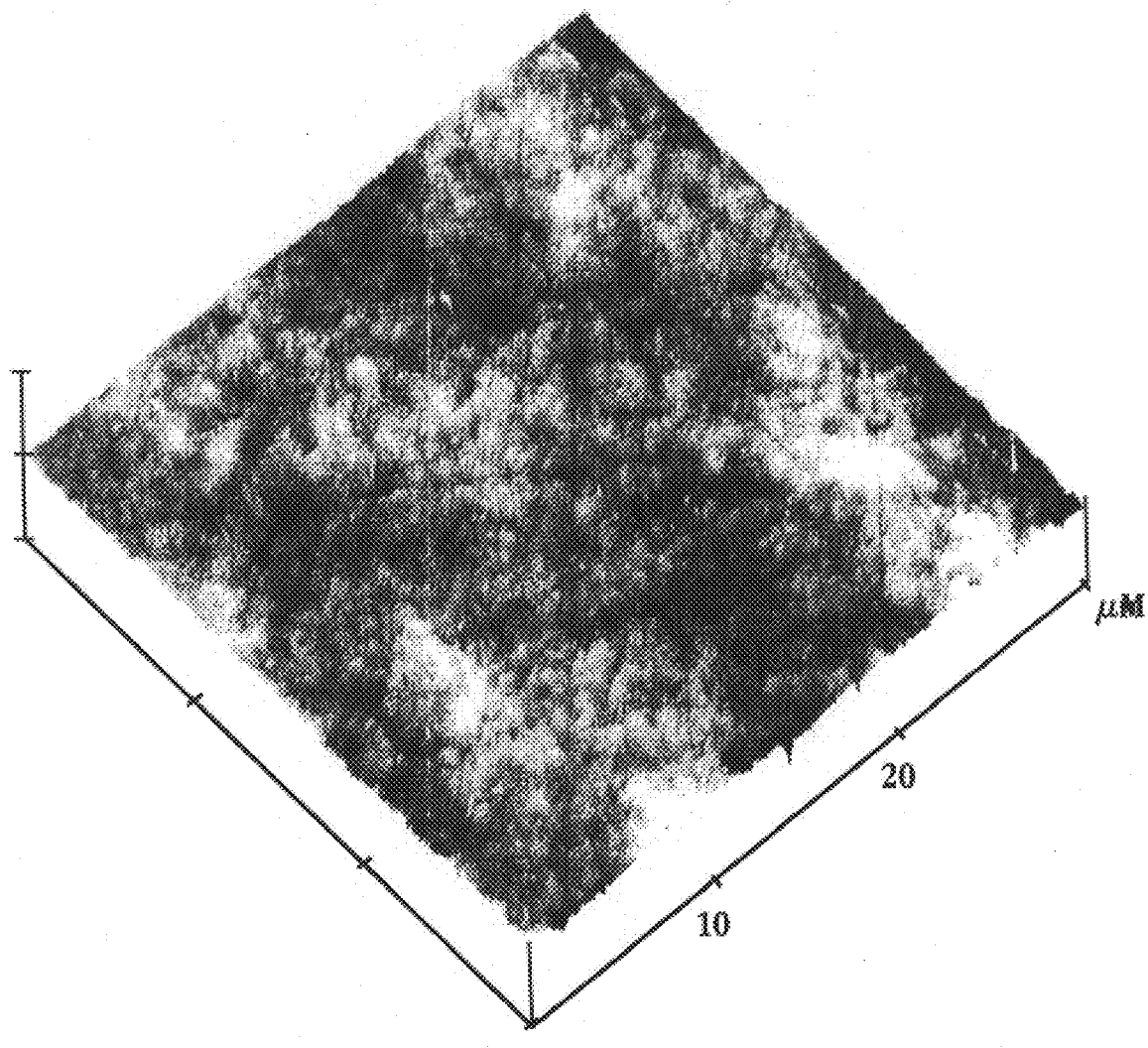
FIG. 5 is a computer-generated image of an AFM image of a comparison substrate which was superpolished using a commercial $Al(NO_3)_3$-based slurry, without $H_2O_2$.

In contrast, an identically treated substrate superpolished using a commercial $Al(NO_3)_3$-based slurry, without inclusion of $H_2O_2$, had an RA of about 4.5 Å, as shown in FIG. 5. The commercial slurry used for comparison was one of the most effective commercially available slurries, and had an $Al(NO_3)_3$ concentration of about 0.33%, about 4 weight % aluminum oxide particles (0.2μ), and a pH similar to that used for the substrate of FIG. 4 (see Example 2). The image of the polished surface shows many more visible scratches than that of FIG. 4, and a higher roughness is apparent along the front edges in the figure.

EXAMPLES

Example 1

First-Step Polishing

A magnetic disk substrate having an electroplated nickel/phosphorus (90% alloy) surface was polished in a commercial polisher (Peter Wolters AC319), using a downward force of 80 daN. Rotation speeds were 12.7 rpm (top plate), −13.7 rpm (bottom plate, reverse direction), and −1.5 rpm (inner pin ring). A commercially available $Al(NO_3)_3$-based slurry, having 0.8μ abrasive particles, was added at a rate of 200 ml/min. This process gave a removal rate of 1490 Å/min. (This process is essentially that used to obtain the surface of FIG. 3.) When $H_2O_2$ was added to the commercial slurry at a concentration of 0.35 wt %, the removal rate was increased to 1990 Å/min (about a 34% increase) without causing any pitting problems.

The process was repeated using a downward force of 110 daN. In this case, the commercial slurry gave a removal rate of 2358 Å/min. Addition of $H_2O_2$ (0.35 wt %) increased the removal rate to 3125 Å/min (about a 33% increase), again without causing any pitting problems.

Example 2

Superpolishing Step

A magnetic disk substrate having an electroplated nickel/phosphorus (90% alloy) surface underwent first-stage polishing substantially as described in Example 1, giving the surface shown in FIG. 3. For the superpolishing step, a slurry containing 0.3 wt % $H_2O_2$, 0.2 wt % $Al(NO_3)_3$, 4 weight % $TiO_2$ particles (0.2μ), and a surfactant and buffer (pH about 3.0–3.2) was supplied to the polishing surfaces at a rate of 200 ml/min. As described above, the resulting surface had an RA of about 0.25 nm (2.5 Å) and showed very few defects (i.e. one or two very shallow scratches) on the AFM image (FIG. 4). A comparison surface, polished using a commercial slurry, as described above (0.33 wt % $Al(NO_3)_3$, 4 weight % aluminum oxide particles (0.2μ), and a surfactant and buffer (pH about 3.0–3.2)), is shown in FIG. 5.

While the invention has been described with reference to specific methods and embodiments, it will be appreciated that various modifications may be made without departing from the invention.

It is claimed:

1. A composition for use in polishing a substrate having a nickel or nickel-containing surface, comprising an aqueous medium containing (a) a chemical etchant, soluble in the aqueous medium and effective to convert nickel metal at said surface to a soluble nickel salt;

(b) suspended abrasive particles; and (c) an oxidizer, wherein said oxidizer is soluble in the aqueous medium, is effective to convert nickel metal at said surface to nickel oxide, wherein each of the etchant and the oxidizer is substantially ineffective, under conditions of said polishing, to solubilize said nickel oxide in the aqueous medium.

2. The composition of claim 1, wherein the etchant is $Al(NO_3)_3$.

3. The composition of claim 2, wherein the oxidizer is selected from $H_2O_2$, $Fe(NO_3)_3$, and $KIO_3$.

4. The composition of claim 3, wherein the oxidizer is $H_2O_2$.

5. The composition of claim 4, wherein said $H_2O_2$ is present in said aqueous medium at a concentration between about 0.1 and 1.0 weight percent.

6. The composition of claim 5, wherein said concentration is between about 0.15 and 0.30 weight percent.

7. The composition of claim 2, wherein the $Al(NO_3)_3$ is present in the aqueous medium at a concentration between about 0.1 and 1.0 weight percent.

8. The composition of claim 7, wherein said concentration is between about 0.1 and 0.5 weight percent.

9. The composition of claim 1, wherein said abrasive particles are aluminum oxide particles, silicon dioxide particles, titanium dioxide particles, or a combination thereof.

10. The composition of claim 1, further comprising a surfactant effective to maintain said particles dispersed in said medium.

11. The composition of claim 10, wherein said surfactant comprises a polyethylene glycol oligomer or polymer.

12. The composition of claim 1, further comprising a buffer effective to maintain the pH of said composition between about 2.5 and 4.5.

13. The composition of claim 1, wherein said aqueous medium is deionized water.

14. A composition for use in polishing a substrate having a nickel or nickel-containing surface, comprising an aqueous medium containing (a) a chemical etchant which is soluble in the aqueous medium, effective to convert nickel metal at said surface to a soluble nickel salt, and substantially ineffective, under conditions of said polishing, to solubilize said nickel oxide in the aqueous medium;

(b) suspended abrasive particles; and (c) an oxidizer selected from $H_2O_2$, $Fe(NO_3)_3$, and $KIO_3$.

15. The composition of claim 14, wherein the oxidizer is $H_2O_2$.

16. A composition for use in polishing a substrate having a nickel or nickel-containing surface, comprising an aqueous medium containing (a) about 0.1 to 1.0 weight percent $Al(NO_3)_3$; (b) suspended abrasive particles; and (c) about 0.1 to 3.0 weight percent $H_2O_2$.

17. The composition of claim 16, wherein said weight percent of $H_2O_2$ is about 0.1 to 1.0 weight percent.

* * * * *